April 7, 1953      F. D. TIBBS      2,634,158

GRAPPLE

Filed Nov. 3, 1950

Forrest Doy Tibbs
INVENTOR.

BY Clarence A. O'Brien
and Harvey B. Jacobson
Attorneys

Patented Apr. 7, 1953

2,634,158

UNITED STATES PATENT OFFICE 2,634,158

GRAPPLE

Forrest Doy Tibbs, Leavittsburg, Ohio

Application November 3, 1950, Serial No. 193,770

1 Claim. (Cl. 294—115)

This invention relates to new and useful improvements in grapples and the primary object of the present invention is to provide a device for removing fish, frogs, turtles and the like from the water in a safe and convenient manner.

Another important object of the present invention is to provide a grapple including a support bar having a terminal loop forming a hand grip that is attached to the bar by a plate that slidably supports a rod for moving a pair of hook members on the bar toward each other.

A further object of the present invention is to provide a grapple of the aforementioned character involving a single pivot that secures the rod to an operator slidable on the bar and which pivot also secures the rod to a pair of links that are pivoted to the hook members.

A still further aim of the present invention is to provide a grapple that is simple and practical in construction, strong and reliable in use, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
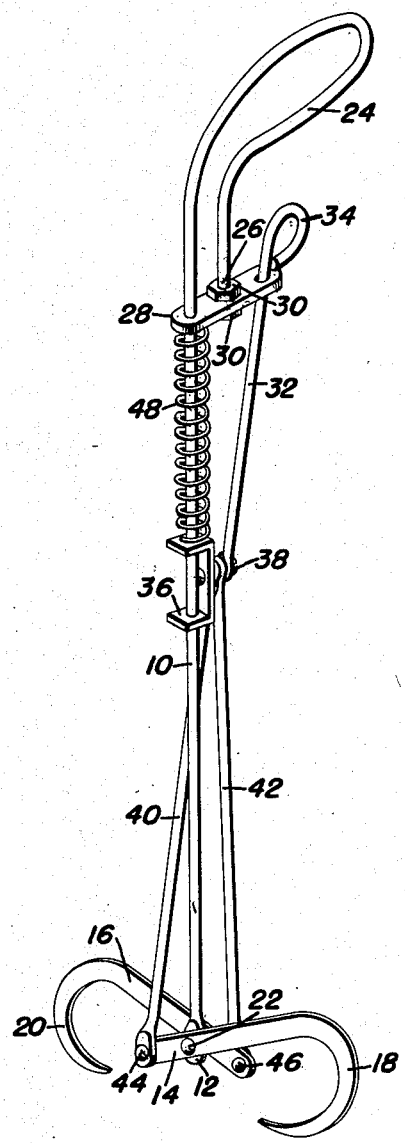
Figure 1 is a perspective view of the present grapple.
Figure 2:
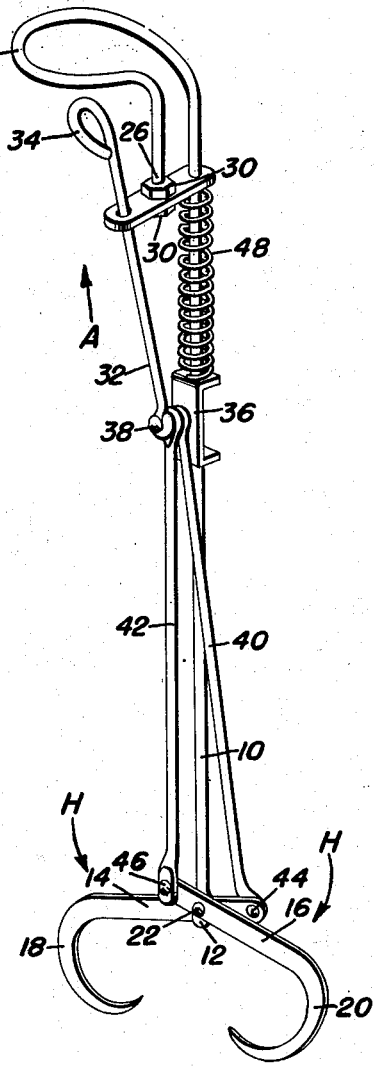
Figure 2 is a perspective view of the present grapple taken opposite from Figure 1.

Referring now to the drawings in detail, wherein for the purpose of illustration, there is disclosed a preferred embodiment of the present invention, the numeral 10 represents a support bar having a lower flattened end 12 that is secured to the shank portions 14 and 16 of hook members 18 and 20 by a transverse pivot or rivet 22.

The upper end portion of the bar 10 is bent to form a loop or hand grip 24 having a threaded end 26 that extends through an aperture in a plate 28. A pair of nuts 30 are threaded on the end 26 and clamp the plate 28 to the end 26. The plate 28 is apertured to receive the bar 10 and is also apertured to slidably receive a rod 32 having an upper terminal loop 34. The plate 28 thus functions as a guide for the rod 32 and a connector and reinforcer for the loop 24.

The upper and lower flanges of a channel shaped operator 36 are provided with registering openings that slidably receive the bar 10. The lower eye end of the rod 32 is secured to the operator 36 by a pivot 38 that also extends through the upper eye ends of a pair of links or pitmans 40 and 42. The lower flattened ends of the links 40 and 42 are secured to the outer ends of the shank 14 and 16 by pivots 44 and 46.

A coil spring 48 surrounds the bar 10 and is biased between the plate 28 and the operator 36 to yieldingly urge the operator toward the hook members and the hook members spread from each other as shown in the drawings.

In practical use of the present invention, the loop 24 is held by one hand of the user and the loop 34 raised by the other hand of the user in the direction of arrow A to swing the hook members together as shown by arrows H. A release of the loop 34 will permit the spring 48 to urge the operator 36 down and will raise the hook members.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A gaff hook comprising a support bar having upper and lower ends, an elongated plate having an inner end formed with an aperture receiving said bar, said plate also having a central aperture disposed intermediate its ends, said bar having a loop integrally formed with its upper end including a straight threaded portion extending downwardly through said central aperture, upper and lower nuts threaded on said portion above and below said plate and holding the plate on the bar and the said portion, a pair of hook members pivoted to the lower end of said bar, a channel-shaped operator including a web and first and second flanges joined by the web and having holes slidably receiving the bar, a pair of links having lower ends pivoted to the hook members and upper ends pivoted to the operator, a rod also pivoted to the operator, a single pivot securing the rod and the upper ends of the links to the web of the operator, said plate including an outer end having an opening slidably receiving said rod, and a spring surrounding the bar and biased between the operator and the inner end of said plate for urging the operator from the plate.

FORREST DOY TIBBS.

REFERENCES CITED

The following references are of record in the file of this patent:

UNITED STATES PATENTS

| Number | Name | Date |
|---|---|---|
| 632,176 | Cook | Aug. 29, 1899 |
| 923,299 | Rodgers | June 1, 1909 |
| 1,415,143 | Briddell | May 9, 1922 |
| 2,420,980 | Reise | May 20, 1947 |